(12) United States Patent
Blöcher et al.

(10) Patent No.: US 10,594,611 B2
(45) Date of Patent: Mar. 17, 2020

(54) FILTERING A DATA PACKET BY MEANS OF A NETWORK FILTERING DEVICE

(71) Applicant: SIEMENS AKTIENGESELLSCHAFT, München (DE)

(72) Inventors: Uwe Blöcher, Puchheim (DE); Rainer Falk, Poing (DE); David von Oheimb, Heimstetten (DE)

(73) Assignee: Siemens Aktiengesellschaft, München (DE)

( * ) Notice: Subject to any disclaimer, the term of this patent is extended or adjusted under 35 U.S.C. 154(b) by 454 days.

(21) Appl. No.: 15/026,051

(22) PCT Filed: Aug. 12, 2014

(86) PCT No.: PCT/EP2014/067239
§ 371 (c)(1),
(2) Date: Mar. 30, 2016

(87) PCT Pub. No.: WO2015/043817
PCT Pub. Date: Apr. 2, 2015

(65) Prior Publication Data
US 2016/0248679 A1    Aug. 25, 2016

(30) Foreign Application Priority Data
Sep. 30, 2013 (DE) .......... 10 2013 219 698

(51) Int. Cl.
*H04L 12/803* (2013.01)
*H04L 12/24* (2006.01)
(Continued)

(52) U.S. Cl.
CPC ........ *H04L 47/125* (2013.01); *H04L 41/0618* (2013.01); *H04L 43/0882* (2013.01); *H04L 47/28* (2013.01)

(58) Field of Classification Search
CPC . H04L 12/12; H04L 12/2816; H04L 12/2827; H04L 12/2803; H04L 12/2823;
(Continued)

(56) References Cited

U.S. PATENT DOCUMENTS 4,042,926 A * 8/1977 Anderson ............. G01S 13/767
342/173
6,665,269 B1 * 12/2003 Schmitz ................ H04W 24/00
370/251

(Continued)

FOREIGN PATENT DOCUMENTS

DE    102011007387 A1    10/2012
EP        2592810 A1     5/2013
(Continued)

OTHER PUBLICATIONS

"Port-Mirroring", http://www.tamos.com/htmlhelp/monitoring/monitoringusingswitches.htm,retrieved on the internet on Sep. 18, 2013.
(Continued)

*Primary Examiner* — Un C Cho
*Assistant Examiner* — Rasha K Fayed
(74) *Attorney, Agent, or Firm* — Lempia Summerfield Katz LLC

(57) ABSTRACT

There is a need for coupling, for example within an automation area, particularly critical subareas with less critical subareas of the automation area. The invention relates to a method and a network filtering device for filtering a data packet between a first network and a second network. According to the invention, a data packet is checked several times in parallel by means of a multiplier and a plurality of filtering devices.

19 Claims, 2 Drawing Sheets

(51) Int. Cl.
*H04L 12/26* (2006.01)
*H04L 12/841* (2013.01)

(58) Field of Classification Search
CPC ............. H04L 12/1836; H04L 12/1881; H04L 12/4625; H04L 67/12; H04L 67/10; H04L 41/22; H04L 41/0618; H04L 2012/2841; H04L 2012/285; H04L 47/125; H04L 47/28; H04L 47/0618; H04L 47/0882; H04L 43/028; H04L 43/12; H04L 43/0882; H04W 4/12; H04W 74/00
USPC ....... 370/230; 700/295, 47, 276, 49; 702/61; 340/635, 3.1
See application file for complete search history.

(56) References Cited

U.S. PATENT DOCUMENTS

| | | | | |
|---|---|---|---|---|
| 9,467,722 | B2* | 10/2016 | Tapie | ................. H03L 7/18 |
| 2002/0141409 | A1* | 10/2002 | Chang | ................. H04L 12/1836 |
| | | | | 370/390 |
| 2007/0100479 | A1* | 5/2007 | Ahmed | ................. G05B 15/02 |
| | | | | 700/47 |
| 2008/0040788 | A1* | 2/2008 | Steinkogler | ......... G06F 19/3418 |
| | | | | 726/11 |
| 2008/0288780 | A1* | 11/2008 | Beukema | ................. G06F 21/72 |
| | | | | 713/181 |
| 2010/0082174 | A1* | 4/2010 | Weaver | ................. H02J 3/14 |
| | | | | 700/295 |
| 2010/0119015 | A1* | 5/2010 | Loiseau | ................. H04B 1/123 |
| | | | | 375/329 |
| 2010/0150285 | A1* | 6/2010 | Tazebay | ............... H04B 1/7097 |
| | | | | 375/346 |
| 2011/0314536 | A1* | 12/2011 | Kuckelman | ............. H04L 63/02 |
| | | | | 726/12 |

FOREIGN PATENT DOCUMENTS

WO  WO2007030520 A2  3/2007
WO  WO2008023961 A1  2/2008

OTHER PUBLICATIONS

Infineon, "Safety-Computing-Platform", http://www.infineon.com/dgdl/Safety-Computing-Platform-XC2300-CIC61508-Product-Brief.pdf?folderId=db3a304317a748360117f45a9c863e84&fileId=db3a3043353fdc16013543303497315d, retrieved on the internet on Sep. 18, 2013.

PCT International Search Report and Written Opinion of the International Searching Authority dated Oct. 1, 2014 for corresponding PCT/EP2014/067239.

* cited by examiner

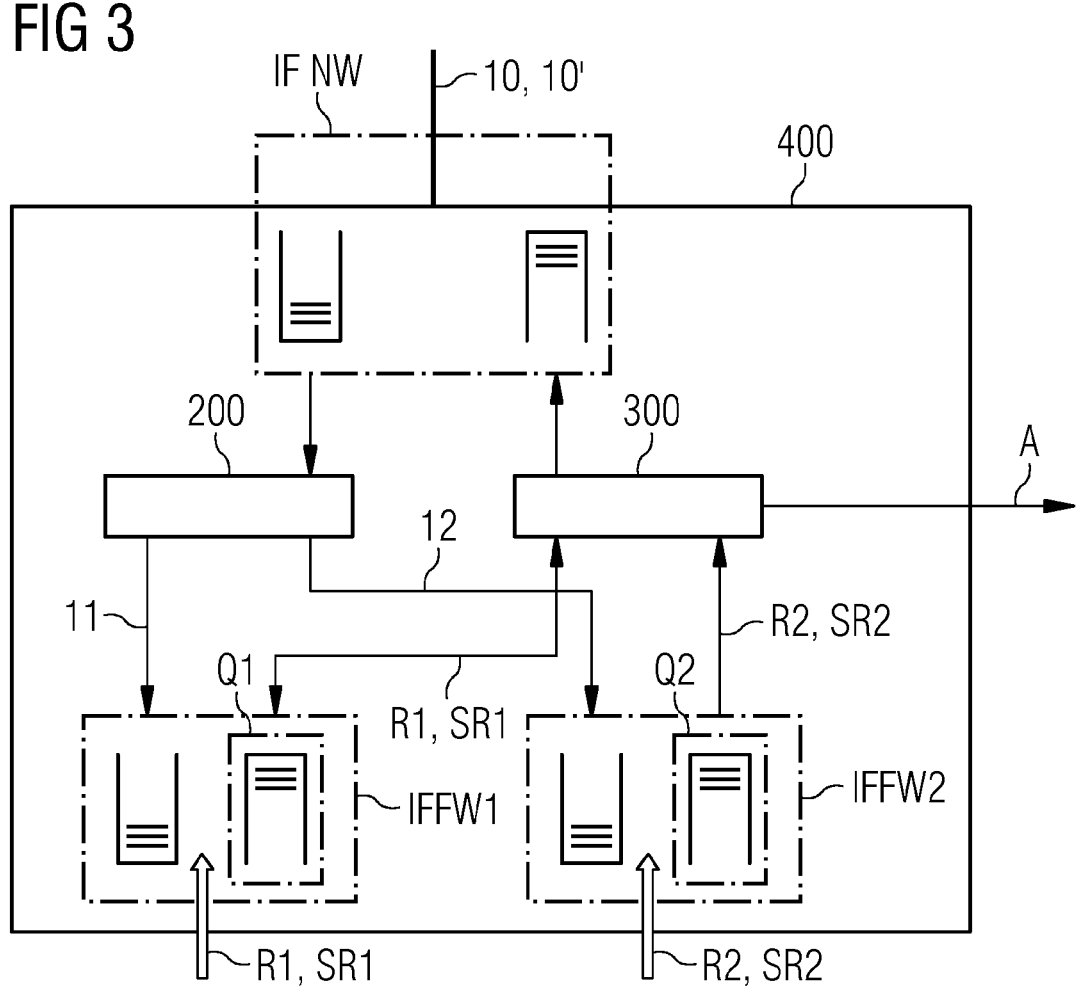

FILTERING A DATA PACKET BY MEANS OF A NETWORK FILTERING DEVICE

This application is the National Stage of International Application No. PCT/EP2014/067239, filed Aug. 12, 2014, which claims the benefit of German Patent Application No. 10 2013 219 698.9, filed Sep. 30, 2013. The entire contents of these documents are hereby incorporated herein by reference.

The present embodiments relate to a method and a network filter device for filtering a data packet between a first network and a second network.

Network boundaries have security gateways or firewalls installed in order to produce controlled coupling of different network areas. In this case, the network traffic is filtered, so that only admissible network traffic is allowed to pass. It is known practice to integrate such a security gateway on a terminal as a personal firewall. For example, this monitors coupling of differently critical network areas, "differently critical" providing, by way of example, that other (e.g., more stringent) demands are made on a data packet that is to be processed in a network.

In industrial automation systems, such as, by way of example, within the context of railway automation in a signal box or in the case of train control, within the context of production automation in a production hall or within the context of process automation operations (e.g., in refineries or breweries), critical automation areas are coupled to general networks (e.g., an office network) apropos of functional safety. In this case, firewalls are used and configured such that only permitted network traffic may pass. Data communication is filtered in accordance with a configurable network security policy in this case, so that only admissible data traffic is forwarded. It is also possible, within an automation area, for particularly critical subareas to be coupled to less critical subareas of the automation area via a security gateway or a firewall. It is thus possible, by way of example, for a safety-critical automation subarea to be coupled to a general automation subarea. For example, it is also possible for two respectively realtime-critical automation subareas to be coupled.

In this case, it is of great importance for a firewall that is faulty (e.g., that allows banned data packets to pass) to be identified. Reasons for faulty operation may be errors in the implementation or in the configuration of the firewall, or as a result of the firewall being compromised by an external attack. Such malfunctions are to be identified and are to be prevented as far as possible.

Within the context of IT environments, firewalls that are of multistage design are available. This involves multiple, independent security components being connected in series, such as a packet filter and then an application level gateway, for example, so that inadmissible network traffic is blocked if at least one component blocks this traffic. As a result, an error in a firewall implementation does not yet lead to inadmissible network traffic being able to pass and therefore represents an increased security level for security-relevant environments in which no safety criteria or realtime criteria are to be satisfied.

The patent application DE 10 2011 007387 discloses the practice of implementing self-monitoring of a gateway. This involves checking whether a corresponding incoming data packet has been received for an outgoing data packet. As a result, it is possible to provide that a gateway does not itself produce data packets on account of a malfunction.

A publication by the Infineon company discloses a safety computing platform in which a safety monitor circuit monitors a main processor and the software execution on the main processor. For example, the safety monitor circuit may perform tests vis-à-vis fixed test patterns and compare results from two independent executions. In this regard, see also the article on the web page http://www.infineon.com/dgdl/Safety-Computing-Platform-XC2300-CIC61508-Product-Brief.pdf?folderId=db3a304317a748360117f-45a9c863e84&fileId=db3a3043353fdc1601354330349-7315d, called up on Sep. 18, 2013.

A network tap is known as a generally known network component in order to be able to listen in to transmitted data without the transmitted data being influenced. The network tap is generally used for network monitoring in which, by way of example, quality of service parameters for throughout or latency are not meant to be influenced by the measurement. The function of a network tap may be provided by a switch that not only forwards a data packet but additionally copies the data packet to a monitoring port. This is also referred to as port mirroring; see the publication at http://www.tamos.com/htmlhelp/monitoring/monitoringusingswitches.htm, called up on Sep. 18, 2013.

SUMMARY AND DESCRIPTION

The scope of the present invention is defined solely by the appended claims and is not affected to any degree by the statements within this summary.

There is a need to provide improved filtering between two different network areas. For example, when realtime-critical networks are involved, there are stringent demands on latency or throughput of the data traffic. The present embodiments may obviate one or more of the drawbacks or limitations in the related art. For example, more efficient and improved filtering of a data packet is provided.

According to one or more of the present embodiments, a method for filtering a data packet by a network filter device between a first network and a second network has the following acts. The data packet is multiplied by a multiplication unit to produce a first data packet and at least one second data packet. A content of the data packet is produced identically in the first data packet and at least in the second data packet. The first data packet is forwarded to a first filter device, and at least the second data packet is forwarded to a second filter device. The first data packet is checked by the first filter device, and at least the second data packet is checked by the second filter device according to respective filter specifications. The method includes producing a first filter result by the first filter device and at least a second filter result by the second filter device, and transmitting the first filter result and the second filter result to a comparison unit. Forwarding of the data packet is blocked between the first network and the second network if the comparison unit identifies, based on the first filter result and at least the second filter result, a comparison result that deviates from a tolerance range.

In the present embodiments, a network filter device may be, by way of example, a component at a coupling point between two networks that checks all passing data traffic. The network filter device includes at least two filter devices (e.g., firewalls). The prescribing of filter specifications is used to configure the filter devices and hence the network filter device. The filter specifications therefore stipulate rules according to which a data packet is checked.

The multiplication unit used is a splitting switch, for example. By way of example, a packet received at a port of the multiplication unit is transmitted to two ports, via which a filter device is connected. This doubles the data packet.

The content of the data packet is obtained in each case. The act of multiplication may therefore involve doubling, tripling, etc.

By way of example, the first network may be a nonsecure network, whereas the second network may be a network within which it is necessary to take into account demands on the realtime capability of a system.

In the application that follows, a comparison unit may be a component that may check a packet or multiple packets within a queue for a similarity with another packet or a queue of packets that are made available to the comparison unit at a second port. This may involve two data packets being established as identical. In addition, a tolerance range that indicates discrepancies between two data packets that are nevertheless meant to be classified as identical may be prescribed. Bit errors that are present in one of the filter results (e.g., as a result of the one of the filter devices) are rated as a comparison result that is within the tolerance range. The comparison unit may also be referred to as a combiner switch.

In the present embodiments, a filter result denotes a packet produced by the filter device that is transmitted to the comparison unit. This may be the respective received data packet that is forwarded by the filter device, for example.

The parallel operation of multiple filter devices creates a network filter device that compares the filter results of the individual filter devices in a simple manner and is therefore monitoring of the operation of the individual filter devices. The complexity for the monitoring therefore remains very low, since only multiplication of the incoming data packets and combination of the filter results to produce the comparison result are necessary. The latency (e.g., the time that is needed for the filtering of the data packet by the network filter device) is prescribed by the greatest latency of the filter devices involved. In contrast to a design with a single firewall, it is possibly no greater or, depending on the embodiment of a firewall installed in parallel, slightly greater.

This provides a defined time response. If the second network is a safety-critical system, for example, then the proposed method allows freedom from disturbance on the safety-critical system with simultaneously reliable filtering of incoming data packets.

According to one embodiment, the respective filter specifications are identical, and the first filter device and the second filter device are produced with different operating systems and/or are manufactured by different manufacturers. In this context, identical may be that the respective filter specifications lead to the same filter result. The respective filter specifications may have the same or a different syntax. In addition, a filter specification may be configured in different ways. This will be the case, for example, if the filter specifications are produced and maintained by different administrators.

The double filtering therefore does not cause a complex new configuration. Identical filter specifications are used for filtering in each case. The use of different operating systems or manufacturers greatly decreases the probability of a systematic, identical error in all firewalls.

The use of different operating systems spreads the risk of errors on account of an implementation. It is therefore possible to compensate for any weaknesses there are in one of the operating systems. In addition, there may also be errors within the application software (e.g., the respective firewall application). Typical sources of error in this context are memory overflows during execution of a program, which may erase parts of a program code.

The choice of different manufacturers for the respective firewall may, given an identical set of rules and, in each case, sound implementation, nevertheless provide a different implementation that firstly may have different weaknesses and secondly provides different security obstacles from the point of view of an attacker. It is also possible for the two filter specifications to be produced and updated by different administrators. A faulty configuration for one of the two filter specifications may be identified in this case if a data packet is admitted only by one filter specification.

According to one development, the blocking outputs an alarm signal.

The alarm signals inconsistent filtering and may initiate automatic precautionary measures. By way of example, responsible centers, such as a network administrator or firewall manufacturer or firewall administrator, for example, may be notified.

According to one embodiment, the blocking blocks data traffic between the first network and the second network.

By way of example, it is possible, independently of or together with output of an alarm signal, for network connections to be interrupted or a firewall to be shut down that has allowed more data packets to pass in comparison with another firewall.

According to one embodiment, the blocking is performed if the first filter result and the second filter result are transmitted at an interval of time and the interval of time is outside a prescribable time period.

Hence, a maximum time span, within which a packet that is made available at one of the ports of the comparison unit may still be used for collation with a packet previously received at the other port, is prescribed.

According to one development, the first filter result transmitted is the first data packet and/or the second filter result transmitted is the second data packet if the respective data packet is identified as valid based on the respective filter specification.

The classification as a valid data packet is stipulated using the filter specifications. If, by way of example, the filter specifications indicate an IP address range that is meant to result in a classification as an invalid data packet, then the destination IP address of the incoming data packet is collated with the prescribed IP address range, for example, and the data packet is identified as valid if the IP destination address is not part of the IP address range.

If the respective data packet is identified as valid, the respective data packet is thus merely forwarded (e.g., not altered). Apart from a bit error, the respective data packet may be identical to the incoming data packet.

According to one embodiment, the first filter result transmitted is not a packet if the respective data packet is identified as invalid based on the respective filter specification.

In this case, the respective filter device that, on account of the configuration of the filter specification, identifies the data packet as not valid (e.g., as invalid) therefore does not forward a packet. Hence, the comparison unit obtains a filter result particularly from one or more filter devices and does not obtain a filter result particularly from one or more filter devices that identify the respective data packet as invalid.

According to one embodiment, the comparison unit is presented with the respective filter result and with further filter results from a subsequently timed further check by the respective filter device, and the comparison result is thus obtained by taking account of the further filter results.

The comparison unit (e.g., a packet comparator) obtains from a first input queue of the first filter device, for example, a list of data packets that have been forwarded by the first filter device. In other words, the first filter device has transmitted a filter result to the data packet. From the second filter device, the packet comparator obtains an input queue that includes fewer data packets, for example, since the second filter device has identified invalid data packets and has not forwarded the invalid data packets. If the comparison unit now obtains no filter result matching a filter result in the first input queue within a prescribed time period at the port of the second filter device, the data packet is blocked. Even if the data packet is thus available in the form of a filter result from the first filter device and would be forwarded based on the assessment or evaluation of the first filter device, the data packet is still not forwarded, since an appropriate filter result is not delivered by the second filter device.

According to one embodiment, the first filter result transmitted and/or the second filter result transmitted is/are a respective substitute packet if the respective data packet is identified as invalid based on the respective filter specification.

Hence, a filter result is transmitted to the comparison unit in each case. When classified as a valid data packet, the filter result is then the original data packet that is forwarded, and, apart from any bit errors present, is identical to the received data packet. If the received data packet is classified as invalid, then the filter result transmitted is a substitute packet.

For example, the transmission of a substitute packet simplifies the collation by the comparison unit when an evaluation of the second data packet, for example, by the second filter device takes longer than the evaluation of the first data packet by the first filter device. If a packet (e.g., a substitute packet in the case of a negative check) is transmitted in each case, then the absence of one of the respective packets to be checked provides that a check is still ongoing. A clear distinction may be drawn between late transmission and blocked transmission.

The use of a substitute packet additionally reduces the risk of like packets being compared with one another by chance and being forwarded by the comparison unit based on a match.

The present embodiments also relate to a network filter device for filtering a data packet between a first network and a second network. The network filter device includes a multiplication unit for multiplying the data packet to produce a first data packet and at least one second data packet. A content of the data packet may be produced identically in the first data packet and at least in the second data packet. The multiplication unit forwards first data packet to a first filter device and also at least the second data packet to a second filter device. The network filter device includes the first filter device for checking the first data packet and the second filter device for checking the second data packet according to respective filter specifications and for respectively transmitting a first filter result and at least one second filter result to a comparison unit. The network filter device also includes the comparison unit for blocking the data packet if, based on the first filter result and at least the second filter result, a comparison result that deviates from a tolerance range may be identified.

In addition, the network filter device according to one embodiment includes a monitoring unit for carrying out one of the method acts according to the embodiments or developments cited above.

The invention is explained in more detail below using exemplary embodiments with reference to the figures. Although the invention is illustrated and described in more detail by the exemplary embodiments, the invention is not restricted by the disclosed examples. Other variations may be derived therefrom by a person skilled in the art without departing from the scope of protection of the invention.

BRIEF DESCRIPTION OF THE DRAWINGS

FIG. 3 shows a schematic illustration of a network filter device according to a third exemplary embodiment.

In the figures, elements having the same function are provided with the same reference symbols unless indicated otherwise.

DETAILED DESCRIPTION

Figure 1:
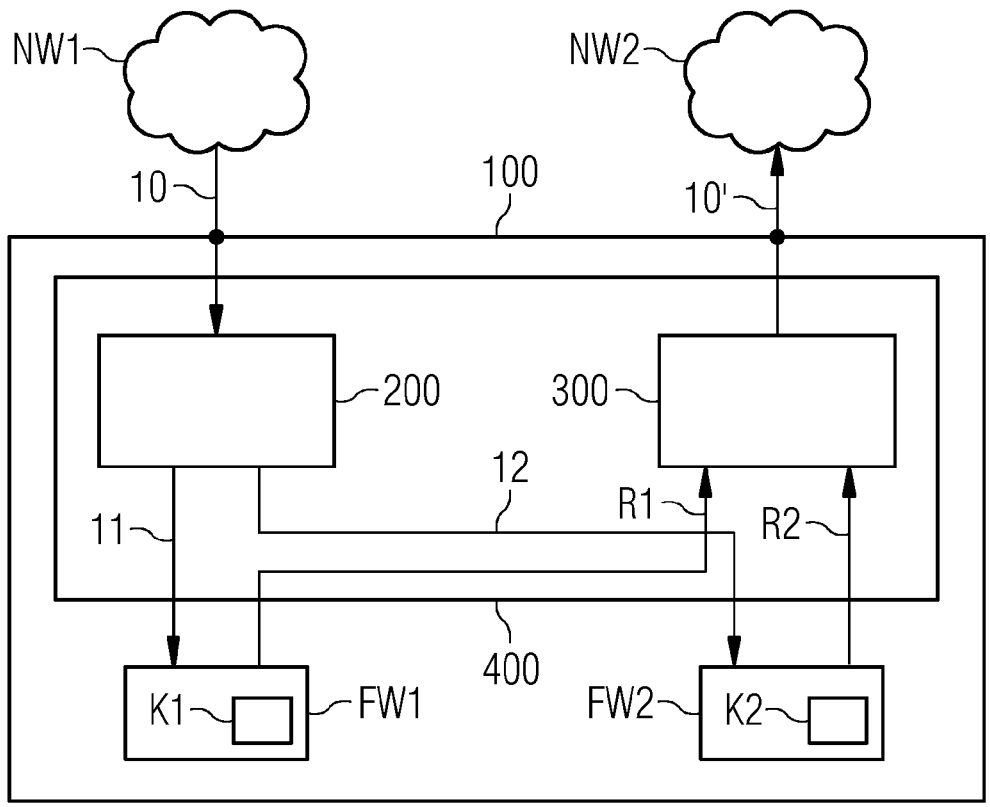
FIG. 1 shows a schematic illustration of a network filter device according to a first exemplary embodiment.

FIG. 1 shows one embodiment of a network filter device 100 that includes a multiplication unit 200 and a comparison unit 300, and also a first filter device FW1 and a second filter device FW2. A port of the multiplication unit 200 obtains a data packet 10 from a first network NW1. By way of example, the first network NW1 is an office network or company network. In the first network NW1, there are no realtime demands, and particularly, access from the Internet is possible. From the point of view of security, there are weaknesses here. The multiplication unit 200 doubles the data packet 10, for example, and produces a first data packet 11 and also a second data packet 12. The respective content of the respective data packets 11, 12 is identical in this case.

The first data packet 11 is forwarded to the first filter device FW1. The first filter device FW1 is a first firewall that has configurable filter specifications K1 or filter rules. The firewall checks the incoming first data packet 11 for demands that exist as a result of the filter specifications K1. For example, the first filter device FW1 has a first filter specification K1 that prescribes an IP address range from which the data packet 10 is to have been sent in order for the data packet 10 to be classified as valid by the first filter device FW1.

In a variant, the filter specification K1 may also prescribe admissible protocols, port numbers, or data content.

In addition, sender applications or destination applications that are rated as an indication of blocking that needs to be performed for a data packet may be prescribed. Additionally, state data about protocols used, such as, for example, user datagram protocol, transmission control protocol, or a state of the connection setup may be stored for existing communication links. For incoming data packets, this information is taken into account during the filtering. The firewall filters based on information at application level, for example. This provide further analysis that allows improved appraisal of the data packets. In this case, a firewall operating at application level logically combines, for example, IP packets and, in so doing, checks for the presence of a useful unit that is obtained as a result of the composition.

If the first data packet 11 meets the demands of the first filter device FW1, the first data packet 11 is forwarded to a comparison unit 300 in the form of a first filter result R1.

In parallel therewith, the second data packet 12 is forwarded to a second filter device FW2. The second filter device FW2 has second filter specifications K2 that match the first filter specifications K1. The second filter device FW2 is a second firewall that, by way of example, is executed on a piece of hardware with an operating system that is a different operating system than that of the first filter device FW1.

If the second filter device FW2 also establishes that the second data packet 12 meets the demands that arise from the second filter specification K2, then the second filter device FW2 also outputs a second filter result R2 in the form of the forwarded second data packet 12 and sends the second filter result R2 to the comparison unit 300. The comparison unit 300 is then provided with the first filter result R1 and the second filter result R2 in a juxtaposition (e.g., a table).

If the comparison unit 300 identifies a match between the first filter result R1 and the second filter result R2 (e.g., because the respective data packets 11 and 12 produced by the multiplication unit 200 have been forwarded without alteration and hence are identical), then a checked data packet 10' is forwarded to the second network NW2. In this case, the first filter result R1 or the second filter result R2 may be forwarded as data packet 10'.

The second network NW2 is a safety-critical automation network within the context of process automation. Demands that are made on data that are transmitted to the second network NW2 externally are very high due to the data set operating states, for example. In the event of a malfunction in a firewall that is a coupling point to an external network, it would, therefore, be possible for configurations that endanger dependability within an installation, for example, to be set.

If at least one of the respective filter devices FW1, FW2 classifies the respective data packet 11, 12 as invalid, transmission of the respective filter result R1, R2 is prevented. The comparison unit 300 is therefore unable to associate a corresponding filter result R2 with the first filter result R1, for example. In this case, the data packet 10 is blocked.

The comparison unit 300 (e.g., a packet comparator) does not just consider one entry at a time from the respective input queue of the respective filter device FW1, FW2, but rather compares multiple entries in each case (e.g., filter results that have been filtered and forwarded in a time sequence by the respective filter device FW1, FW2). As soon as an identical packet is included in both queues, the packets also being able to be situated at different positions within the queue, the packet is removed from the queue and sent to the port connected to the second network NW2. In this case, two filter results R1, R2 may be identified as an identical packet if, apart from bit errors, there is a match in the data.

It is thus also possible for a change in the order of the respective data packets 11, 12 that are to be filtered to be made by the respective filter device FW1, FW2. This may be prescribed based on realtime demands. It is thus possible for the order of the respective data packets 11, 12 that have been transmitted to the respective filter device FW1, FW2 not to match the order of the associated filter results. This may be the case, for example, as a result of prioritization that is performed by the respective filter device FW1, FW2. By way of example, prioritization may be advantageous if realtime demands on the data traffic exist, and therefore, the respective filter device FW1, FW2 prefers to check a specifically denoted data packet.

For example, when multiple respective filter results R1, R2 are collated (e.g., in the case of 2, 3, 5 or 8 entries per queue), a time period within which the collation of the respective filter results R1, R2 is to be performed may also be prescribed. After this time period has elapsed, the data packet 10 is not forwarded and the respective filter result entry is removed from the list.

For implementations for which prioritization of the respective data packets 11, 12 is important, it is advantageous to set up multiple output queues and input queues at the respective interface to the respective filter device FW1, FW2. The comparison by the comparison unit 300 may then be performed per input queue, with each queue representing a different quality of service class, for example.

Figure 2:
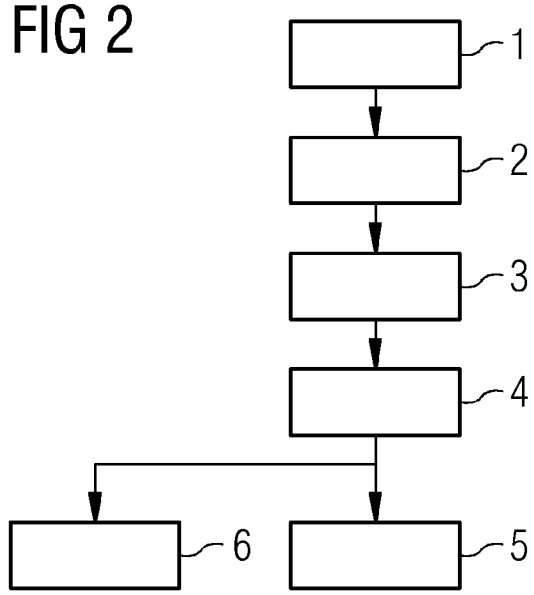
FIG. 2 shows a schematic illustration of a method according to a second embodiment.

FIG. 2 shows a schematic flowchart for an application of the method according to a second exemplary embodiment. Multiplication 1 of the data packet by a multiplication unit to produce a first data packet and at least one second data packet is followed by the forwarding 2. The forwarding 2 involves both the first data packet produced by the multiplication unit being forwarded to a first filter device and the second data packet produced by the multiplication unit being forwarded to a second filter device.

Checking 3 of the first data packet by the first filter device and checking 3 of the at least one second data packet by the second filter device then follows. The production of a respective filter result and transmission 4 of the respective filter result to a comparison unit follows.

The acts of forwarding 2, checking 3, and production and transmission 4 are performed in parallel methods. In this case, parallel provides that method acts that are performed by components arranged in parallel in the process are performed. This involves a component being categorized in the network filter device according to the operation of the component (e.g., logical categorization).

In addition, parallel provides that the acts are carried out simultaneously (e.g., at parallel times in relation to one another) in a time sequence.

The act of production and transmission 4 of the respective filter result is followed by the blocking 5 of the data packet if the comparison unit identifies, based on the first filter result and at least the second filter result, a comparison result that deviates from a tolerance range.

For a comparison result that lies within the tolerance range and therefore indicates a valid data packet that has not been filtered out by both firewalls, provision 6 of a checked data packet for the second network takes place.

FIG. 3 shows how, according to a third exemplary embodiment of the present embodiments, a splitting/combiner switch 400 includes the multiplication unit 200 and also the comparison unit 300. In addition, an interface IFNW to the first network and also to the second network is shown. From there, the splitting/combiner switch obtains the data packet 10 to be filtered (e.g., from a realtime-critical automation subarea). The first data packet 11 produced by the multiplication unit 200 is sent to a first filter device via a first filter interface IFFW1. For the purpose of sending, the first data packet 11 is stored on the first filter interface IFFW1 in an output queue. A filter result R1 provided by the first filter device is stored in the input queue Q1 of the first filter interface IFFW1.

The process is carried out in a corresponding manner for the second data packet 12 on a second filter interface IFFW2 to a second filter device. There, a filter result R2 is stored in the respective input queue Q2. If the second device establishes that a second data packet 12 is invalid, the second device delivers a second substitute packet SR2 as filter result R2. The comparison unit 300 or the packet comparator is then presented with two filter results R1, R2 that do not match, since the substitute packet SR2 is a standardized packet denoted by the second filter device.

The filter interfaces IFFW1, IFFW2 may be implemented as a local interface (e.g., as an SPI interface, PCI interface, USB interface, or Ethernet interface). The filter interfaces IFFW1, IFFW2 may likewise be implemented as remote interfaces, with the respective data packet 11, 12 and the respective filter results R1, R2, SR1, SR2 being transmitted via an internet connection (e.g., an HTTP connection or a TCP connection). In this case, the filter interfaces IFFW1, IFFW2 may be implemented in an identical manner or in different manners.

The comparison unit has a tolerance range available, within which, in the event of discrepancies in the respective filter results R1, R2, a comparison result is identified. On the basis of this, the data packet is still forwarded.

On the basis of collation of the first data packet 11, which is forwarded by the first filter device as a first filter result R1 with the second substitute packet SR2, which is provided by the second filter device, a comparison result that does not lie within the tolerance range is available. The data packet 10 is not forwarded to a second, likewise realtime-compatible, automation subarea.

If, in a variant, the first filter device also identifies the first data packet 11 as invalid, then the first filter result R1 is a first substitute packet SR1. The first substitute packet SR1 is denoted by the first filter device, and the comparison result from the collation of the first substitute packet SR1 with the second substitute packet SR2 lies outside the tolerance range.

The use of a substitute packet reduces the risk of like packets that are sent in succession being forwarded by chance even if one of the installed filter devices does not forward the packet. If, by way of example, the first filter result R1 provided is a packet P1 and if the second filter device blocks the forwarding and does not provide a substitute packet, then the comparison of the first filter result R1 is collated opposite a subsequent second filter result R2, for example, that arose from subsequent filtering of a data packet sent later. If it is now by chance a packet P2 that is identical to the first packet P1, then the blocking by the second filter device would not be identified.

In this case, two respectively realtime-critical automation subareas are coupled to one another. This involves the presented network filter device being used to check a data packet multiple times in parallel, which increases robustness without any substantial additional time delay.

In a variant, the comparison unit 300 outputs an alarm signal A if the comparison unit 300 is provided with a substitute packet SR1, SR2 by at least one of the filter devices. For example, the forwarding of the data packet 10 may be blocked if all filter devices involved provide a substitute packet. In this case, an alarm signal A may be omitted, since the network filter device with all of its filter devices involved is then acknowledged as operating correctly.

In a variant, the network filter device prompts notification of a monitoring system based on the alarm signal. As a result, an emergency signal that, by way of example, prompts the check by a service personnel or by a monitoring component of an installation (e.g., within the second network) may be output.

The respective units such as the network filter device, the multiplication unit, the respective filter device, the comparison unit and also the monitoring unit may be implemented in hardware and/or even in software. An implementation in hardware may involve the respective unit being in the form of an apparatus or in the form of part of an apparatus (e.g., in the form of a computer or in the form of a microprocessor). An implementation in software may involve the respective unit being in the form of computer program product, in the form of a function, in the form of a routine, in the form of part of a program code, or in the form of an executable object.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for filtering a data packet by a network filter device between a first network and a second network, the method comprising:

producing a first data packet and at least one second data packet, the producing of the first data packet and the at least one second data packet comprising multiplying the data packet by a multiplication unit, wherein a content of the data packet is produced identically in the first data packet and the at least one second data packet;

forwarding the first data packet to a first filter device and forwarding the at least one second data packet to a second filter device;

identifying the first data packet by the first filter device as valid or invalid according to a first filter specification and identifying the at least one second data packet by the second filter device as valid or invalid according to a second filter specification;

producing a first filter result by the first filter device according to the first filter specification and at least one second filter result by the second filter device according to the second filter specification and transmitting the first filter result and the at least one second filter result to a comparison unit both when the first data packet is identified as valid and when the first data packet is identified as invalid according to the first filter specification, and both when the at least one second data packet is identified as valid and when the at least one second data packet is identified as invalid according to the second filter specification; and blocking forwarding of the data packet between the first network and the second network when the comparison unit identifies, based on the first filter result when the first data packet is identified as valid or invalid and the at least one second filter result when the at least one second data packet is identified as valid or invalid, a comparison result that deviates from a tolerance range, wherein the tolerance range indicates acceptable discrepancies between the first filter result and the at least one second filter result.

2. The method of claim 1, wherein the first filter specification and the second filter specification are identical, and the first filter device and the second filter device are produced with different operating systems, are manufactured by different manufacturers, or a combination thereof.

3. The method of claim 1, wherein the blocking outputs an alarm signal.

4. The method of claim 1, wherein the blocking blocks data traffic between the first network and the second network.

5. The method of claim 1, wherein the blocking is performed when the first filter result and the at least one second filter result are transmitted at an interval of time and the interval of time is outside a prescribeable time period.

6. The method of claim 1, wherein the first filter result transmitted is the first data packet when the first data packet is identified as valid according to the first filter specification, and wherein the at least one second filter result transmitted is the at least one second data packet when the at least one second data packet is identified as valid according to the second filter specification.

7. The method of claim 1, wherein the first filter result transmitted is not the first data packet when the first data packet is identified as invalid according to the first filter specification, and wherein the at least one second filter result transmitted is not the at least one second data packet when the at least one second data packet is identified as invalid according to the second filter specification.

8. The method of claim 1, wherein the comparison unit is presented with the first filter result and the at least one second filter result and with further filter results from a subsequently timed further check by the first filter device or the second filter device, and the comparison result is thus obtained by taking account of the further filter results.

9. The method of claim 1, wherein the comparison result deviates from the tolerance range when the first substitute packet, the at least one second substitute packet, or a combination thereof is transmitted to the comparison unit.

10. The method of claim 1, wherein the first filter result transmitted is a first substitute packet when the first data packet is identified as invalid according to the first filter specification, and wherein the at least one second filter result transmitted is at least one second substitute packet when the at least one second data packet is identified as invalid according to the second filter specification.

11. A network filter device for filtering a data packet between a first network and a second network, the network filter device comprising:
  a first processor configured to:
    produce a first data packet and at least one second data packet, the production of the first data packet and the at least one second data packet comprising multiplication of the data packet, wherein a content of the data packet is producible identically in the first data packet and the at least one second data packet; and
    forward the first data packet to a first filter device and the at least one second data packet to a second filter device;
  the first filter device configured to identify the first data packet as valid or invalid according to a first filter specification, and the second filter device configured to identify the second data packet as valid or invalid according to a second filter specification, the first filter device and the second filter device being configured, respectively, for transmitting a first filter result and at least one second filter result both when the first data packet is identified as valid and when the first data packet is identified as invalid according to the first filter specification, and both when the at least one second data packet is identified as valid and when the at least one second data packet is identified as invalid according to the second filter specification;
  wherein the first processor or a second processor is configured to block the data packet when, based on the first filter result when the first data packet is identified as valid or invalid and the at least one second filter result when the at least one second data packet is identified as valid or invalid, a comparison result that deviates from a tolerance range is identifiable, wherein the tolerance range indicates acceptable discrepancies between the first filter result and the at least one second filter result.

12. The network filter device of claim 11, wherein the first processor or a third processor is configured to output an alarm signal when the data packet is blocked.

13. The network filter device of claim 12, wherein the first processor or the third processor is configured to block data traffic between the first network and the second network.

14. The network filter device of claim 12, wherein the first processor or the third processor is configured to block the data packet when the first filter result and the at least one second filter result are transmitted at an interval of time and the interval of time is outside a prescribeable time period.

15. The network device of claim 11, wherein the first filter specification and the second filter specification are identical, and the first filter device and the second filter device are produced with different operating systems, are manufactured by different manufacturers, or a combination thereof.

16. The network device of claim 11, wherein the first filter result transmitted is the first data packet when the first data packet is identified as valid according to the first filter specification, and wherein the at least one second filter result transmitted is the at least one second data packet when the at least one second data packet is identified as valid according to the second filter specification.

17. The network device of claim 11, wherein the first filter result transmitted is not the first data packet when the first data packet is identified as invalid according to the first filter specification, and wherein the at least one second filter result transmitted is not the at least one second data packet when the at least one second data packet is identified as invalid according to the second filter specification.

18. The network device of claim 11, wherein the first filter result transmitted is a first substitute packet when the first data packet is identified as invalid according to the first filter specification, and wherein the at least one second filter result transmitted is at least one second substitute packet when the at least one second data packet is identified as invalid according to the second filter specification.

19. The network device of claim 11, wherein the comparison result deviates from the tolerance range when the first substitute packet, the at least one second substitute packet, or a combination thereof is transmitted to the comparison unit.

* * * * *